United States Patent
Trossen et al.

(10) Patent No.: US 7,502,384 B2
(45) Date of Patent: Mar. 10, 2009

(54) SYSTEMS AND METHODS FOR PROVIDING ASYNCHRONOUS REQUEST-RESPONSE SERVICES

(75) Inventors: Dirk Trossen, Cambridge, MA (US); Michael Mahan, San Diego, CA (US); Frederick Hirsch, Melrose, MA (US)

(73) Assignee: Nokia Corporation, Espoo (FI)

( * ) Notice: Subject to any disclaimer, the term of this patent is extended or adjusted under 35 U.S.C. 154(b) by 619 days.

(21) Appl. No.: 11/018,451

(22) Filed: Dec. 20, 2004

(65) Prior Publication Data

US 2006/0133385 A1 Jun. 22, 2006

(51) Int. Cl.
*H04L 12/12* (2006.01)
(52) U.S. Cl. ........................ 370/466; 709/228
(58) Field of Classification Search ................ 370/328, 370/340, 465, 466, 469; 455/418–420; 709/227, 709/228, 237
See application file for complete search history.

(56) References Cited

U.S. PATENT DOCUMENTS

| | | | |
|---|---|---|---|
| 6,934,756 B2 * | 8/2005 | Maes | 709/227 |
| 6,983,312 B1 * | 1/2006 | O'Neil | 709/217 |
| 7,418,485 B2 * | 8/2008 | Payrits | 709/220 |
| 2004/0071099 A1 * | 4/2004 | Costa-Requena et al. | 370/260 |
| 2005/0044188 A1 * | 2/2005 | Nakazawa et al. | 709/219 |
| 2005/0071423 A1 * | 3/2005 | Rajaniemi | 709/203 |
| 2005/0213724 A1 * | 9/2005 | O'Brien et al. | 379/202.01 |

OTHER PUBLICATIONS

M. Handley, V. Jacobson; *SDP: Session Description Protocol*; Apr. 1998; 40 pages; The Internet Society (1998).

T. Berners-Lee, R. Fielding, L. Masinter; *Uniform Resource Identifiers(URI): Generic Syntax*; Aug. 1998; 29 pages; The Internet Society (1998).

Don Box, David Ehnebuske, Gopal Kakivaya, Andrew Layman, Noah Mendelsohn, Hendrick F. Neilsen, Satish Thatte, Dave Winer; *Simple Object Access Protocol(SOAP)* 1.1; May 2000; 34 pages; DevelopMentor, International Business Machines Corporation, Lotus Development Corporation, Microsoft (2000).

Tim Bray, Jean Paoli, C.M. Sperberg-McQueen, Eve Maler; *Extensible Markup Language(SML) 1.0 (Second Edition)*; Oct. 2000; 58 pages; W3C® 2000.

Heather Kreger; *Web Services Conceptual Architecture(WSCA 1.0)*; May 2001; 41 pages; available at <http://www-306.ibm.com/software/solutions/webservices/pdf/WSCA/pdf>.

(Continued)

*Primary Examiner*—Wing F Chan
*Assistant Examiner*—Duc T Duong
(74) *Attorney, Agent, or Firm*—Alston & Bird LLP (57) ABSTRACT

A system for invoking a service includes an invoking entity and a network entity such as a service provider. The invoking entity can send a service invocation request to effectuate invocation of a service. The service invocation request is formatted and sent in accordance with a given messaging architecture (e.g., SOAP). The network entity is capable of receiving the service invocation request, such as to invoke the requested service. The network entity can also send a response to the service invocation request, although the response is sent across a SIP architecture. Similar to the service invocation request, the response includes a payload formatted in accordance with the given messaging architecture. Thus, although the network entity can send a response across a SIP architecture, the invoking entity sends the service invocation request independent of the SIP architecture.

24 Claims, 3 Drawing Sheets

OTHER PUBLICATIONS

E.O'Tuathail, M. Rose; *Using the Simple Object Access Protocol (SOAP) in Blocks Extensible Exchange Protocol (BEEP)*; Jun. 2002; 19 pages; The Internet Society (2002).

A.B. Roach; *Session Initiation Protocol (SIP)—Specific Event Notification*; Jun. 2002; 38 pages; The Internet Society (2002).

* cited by examiner

SYSTEMS AND METHODS FOR PROVIDING ASYNCHRONOUS REQUEST-RESPONSE SERVICES

FIELD OF THE INVENTION

The present invention relates generally to telecommunications networks and, more particularly, relates to systems and methods for providing asynchronous request-response services in networks.

BACKGROUND OF THE INVENTION

Event subscription and notification in network environments is becoming increasingly commonplace and important. Event subscription generally allows a first network entity to subscribe to event notifications from a second entity. Common examples of events include "presence" and "location;" however, the number and types of events are endless. For instance, conventional instant messaging services permit a first user to subscribe to a presence event for a second user. As such, during the period of the subscription, the first user receives updates as to the presence status (e.g., online or offline) of the second user. The subscription may be for a single inquiry, which will return a response of "present" or "not present" for the second user. The subscription may also be for a set period of time, which may result in multiple updates, or for other options (e.g., status change notifications, ongoing notifications, etc.)

Various protocols may be used for event subscription and notification. For example, the Session Initiation Protocol (SIP) may be used for such purposes (see, e.g., IETF request for comment document RFC 3261, entitled: *SIP: Session Initiation Protocol,* July 2002, the contents of which are hereby incorporated by reference in its entirety). SIP was generally developed to allow for initiating a session between two or more endpoints in the Internet by making these endpoints aware of the session semantics. Accordingly, devices (or users that run certain applications on these devices) are registered with the SIP backbone so that an invitation to a particular session can be correctly delivered to these endpoints. To achieve this, SIP provides a registration mechanism for devices and users, and it applies mechanisms such as location servers and registrars to route the session invitations appropriately. Although SIP is primarily a tool for initiating a communication session between endpoints, extensions to SIP have been proposed to provide event registration and trigger notification (see e.g., IETF document RFC 3265, *SIP-Specific Event Notification,* July 2002, the contents of which are hereby incorporated by reference in its entirety).

The SIP event framework, which would enable event-based information provisioning to any node in the Internet, is supposed to become a key element within the SIP infrastructure. Apart from providing information regarding certain events, such as presence or location, the SIP event framework provides the means for an event-based service invocation system. Currently, for example, messaging protocols such as SOAP (Simple Object Access Protocol) are being used to invoke Web services. The SOAP architecture provides a manner of encapsulating messages in envelopes, sometimes referred to as SOAP messages or SOAP envelopes, which can then be transferred from one network entity to another over a bearer protocol, such as HTTP (Hypertext Transfer Protocol). In this regard, information in the encapsulated messages can be formatted in any of a number of different manners, such as in accordance with Resource Description Framework (RDF) or XML (Extensible Markup Language). For more information on SOAP, see D. Box et al., *Simple Object Access Protocol V*1.1, W3C Note NOTE-soap-20000508, World Wide Web Consortium (2000), the contents of which are hereby incorporated by reference in its entirety.

A fundamental feature of such an event-based service invocation system is that full network connectivity exists for both requests and corresponding responses. Devices such as mobile stations, however, do not currently provide for such full network connectivity. In this regard, the adoption of service processing in mobile stations is constrained by the cellular operator network and its availability of public IP (Internet Protocol) addresses. Many mobile stations are not associated with a public IP address due to the limited number of addresses available in a number of current versions of IP, including IPv4. Due to the mobility of a device such as a mobile station, the mobile station may change its IP address throughout execution of a desired service. Since the necessary DNS (Domain Name Service) re-registration of the host URI (Uniform Resource Identifier) may require an unreasonable amount of time, possibly resulting in failure of connection requests from a server providing the desired service. Further exasperating the situation, the wireless data network has intrinsic QOS (Quality of Service) properties (e.g., shadows, handoffs, high latency) that present problems in a typical request-response SOAP environment.

Current cellular data networks typically only provide simple, synchronous web services initiated by mobile stations operating in such networks. In other terms, current cellular data networks do not enable devices to address and reach a mobile station using HTTP from the Internet to invoke a service at the mobile station. There exist or will soon exist a suite of mobile applications, however, that do not fit this simple programming model. In this regard, mobile stations are or will soon be capable of hosting reachable Web services themselves. Such services could encapsulate, for example, GPS location, personal calendar, contact information or the like.

SUMMARY OF THE INVENTION

In light of the foregoing background, embodiments of the present invention provide a system and method for providing asynchronous request-response services, particularly for devices such as mobile stations. As current cellular data networks do not enable devices to initiate communication with a mobile terminal using HTTP from the Internet to invoke a service at the mobile terminal, mobile terminals require an asynchronous service invocation model to effectively effectuate service invocation. In such an asynchronous service invocation model, responses to a service invocation are passed back to the invoking devices using an alternative protocol mechanism to allow the responses to be delivered. Providing responses in such a manner is often referred to as "callback." In a mobile environment, callback typically uses a separate transfer protocol than the service invocation request. Comparitively, in environments where the invoking entity and the service provider are both reachable using the same protocol (e.g., HTTP), callback can alternatively be provided using separate sessions of the same protocol between the service invocation request and response.

Embodiments of the present invention therefore provide a system and method for invoking a service, such as a Web service, in an asynchronous manner. In accordance with embodiments of the present invention, service invocation is effectuated by formatting and sending a service invocation request in accordance with a given messaging architecture, such as SOAP. Then, in response to the service invocation request, a response can be received over the SIP event framework, where the response is formatted in accordance with the same messaging architecture (e.g., SOAP).

According to one aspect of the present invention, a system is provided for invoking a service, where the system includes an invoking entity and a network entity such as a service provider. The invoking entity is capable of sending a service invocation request to effectuate invocation of a service. In this regard, the invoking entity is capable of formatting and sending the service invocation request in accordance with a given messaging architecture. For example, the invoking entity can be capable of sending the service invocation request encapsulated in accordance with a protocol of the given messaging architecture, such within a SOAP envelope, where the request is sent over a bearer protocol, such as HTTP.

The network entity is capable of receiving the service invocation request, such as to invoke the requested service. The network entity can also send a response to the service invocation request. In accordance with this aspect of the present invention, however, the response is sent across a SIP architecture. Similar to the service invocation request, the response includes a payload formatted in accordance with the given messaging architecture (e.g., SOAP). In this regard, although the network entity can send a response across a SIP architecture, the invoking entity sends the service invocation request independent of the SIP architecture. Before sending the response, however, the network entity can be further capable of generating an implicit SIP event subscription for the service invocation. The network entity can then be capable of sending the response in accordance with the implicit SIP event subscription.

A network entity, invoking entity and method are also provided for invoking a service. Embodiments of the present invention therefore provide an improved system, network entity, invoking entity and method for service invocation. Advantageously, embodiments of the present invention are capable of invoking a service in accordance with a given messaging architecture. In response, the network entity can invoke the service, and send one or more responses back to the invoking entity. The response is sent across a SIP architecture independent of the given messaging architecture, although the response is formatted in accordance with the same messaging architecture. As such, the system and method of embodiments of the present invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
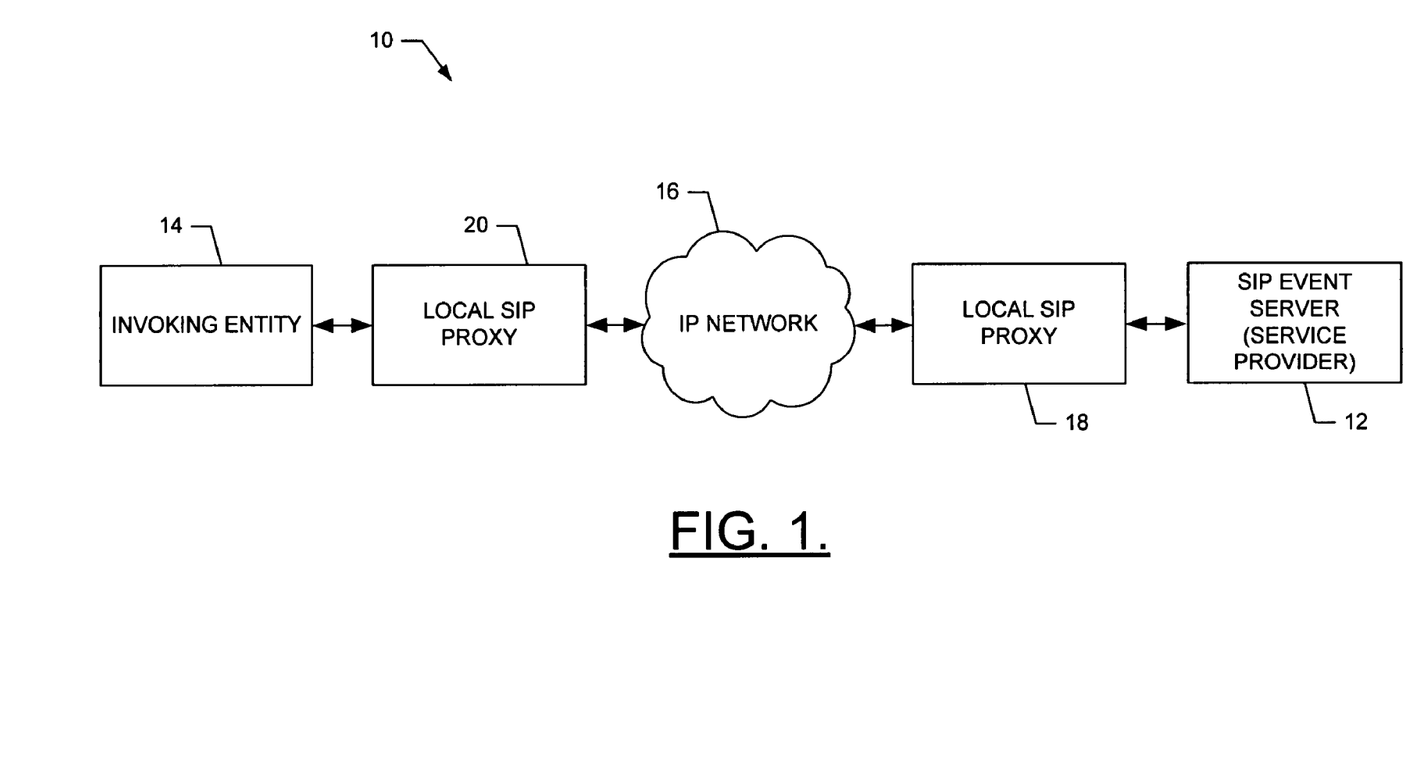
FIG. 1 shows a system that supports service invocation according to one embodiment of the present invention.

Referring now to FIG. 1, a general system 10 is shown that supports service invocation in one or more networks, in accordance with embodiments of the present invention. The system generally includes one or more SIP (Session Initiation Protocol) SIP event servers 12, an invoking entity 14, and an IP communications network 16 through which the SIP event server(s) and the invoking entity communicate. As will be appreciated, the network entities in the system can be addressable or otherwise uniquely identifiable within the network, such as by means of a respective uniform resource identifier (URI). Also in accordance with embodiments of the present invention, the system may provide a SIP framework. As such, the SIP event servers and the invoking entity are each registered with a corresponding local SIP proxy 18 and 20, respectively. As shown, a plurality of SIP event servers is registered with the same SIP proxy. It should be understood, however, that one or more SIP proxies may alternatively register a single SIP event server, without departing from the spirit and scope of the present invention. Based on the illustrated system, then, methods of invoking a service according to embodiments of the present invention may be practiced, as explained below.

The SIP event server 12 may include, or otherwise be in communication with, one or more service providers (shown integral w/the SIP event server) such as one or more mobile stations or other devices having service and/or content capabilities, such as being able to support multimedia sessions of various parameters. The invoking entity 14 may be any network entity that invokes a service at one or more SIP event servers 12. In this regard, the SIP event servers may be in communication with one or more local repositories (not shown), each of which maintains a database of service and/or content subscriptions.

As described herein, then, various fanctions may be described as being performed by the SIP event server 12 or a corresponding service provider. It should be understood, however, that one or more of those functions can additionally or alternatively be performed by the other of the SIP event server or the service provider integral, or otherwise in communication with, one another. Thus, unless otherwise stated, functions described herein as being carried out by the SIP event server can be carried out by the service provider, embodied in a separate network entity or within the SIP event server. Similarly, functions described herein as being carried out by the service provider can be carried out by the SIP event server, embodied in a separate network entity or within the service provider.

Figure 2:
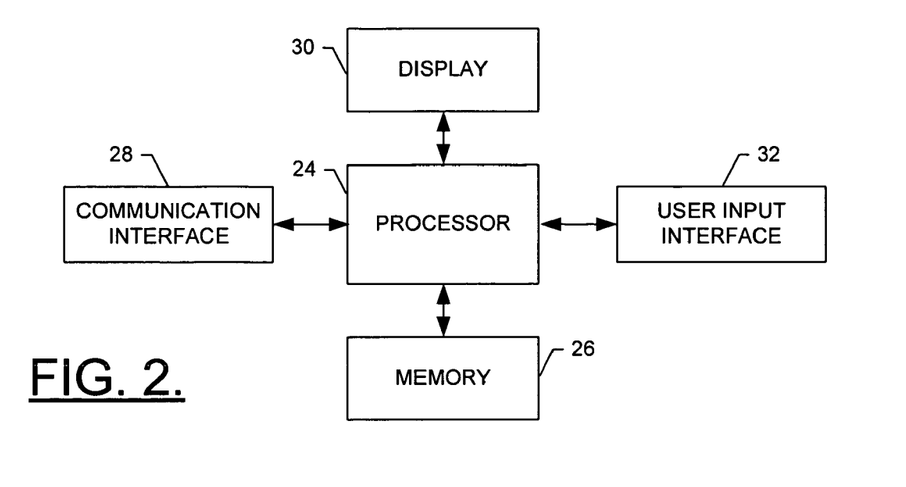
FIG. 2 is a schematic block diagram of an entity capable of operating as an event server, invoking entity and/or SIP proxy, in accordance with one embodiment of the present invention.

Now referring to FIG. 2, a block diagram of an entity capable of operating as a SIP event server 12, invoking entity 14 and/or SIP proxy 18, 20, is shown in accordance with one embodiment of the present invention. Although shown as separate entities, in some embodiments, one or more entities may support one or more of a SIP event server, invoking entity and/or SIP proxy, logically separated but co-located within the entit(ies). For example, as indicated above, a single entity may support a logically separate, but co-located, SIP event server and service provider. Also, for example, a single entity may support a logically separate, but co-located, SIP event server and SIP proxy, or invoking entity and SIP proxy.

As shown, the entity capable of operating as a SIP event server 12, invoking entity 14 and/or SIP proxy 18, 20 generally includes a processor 24 connected to a memory 26. The memory can comprise volatile and/or non-volatile memory, and typically stores content, data or the like. For example, the memory typically stores content transmitted from, and/or received by, the entity. Also for example, the memory typically stores applications, instructions or the like for the processor to perform steps associated with operation of the entity in accordance with embodiments of the present invention. In addition to the memory, the processor can also be connected to at least one interface or other means for displaying, transmitting and/or receiving data, content or the like. In this regard, the interface(s) can include at least one communication interface 28 or other means for transmitting and/or receiving data, content or the like, as well as at least one user interface that can include, for example, a display 30 and/or a user input interface 32. The user input interface, in turn, can comprise any of a number of devices allowing the entity to receive data from a user, such as a keypad, a touch display, a joystick or other input device.

Figure 3:
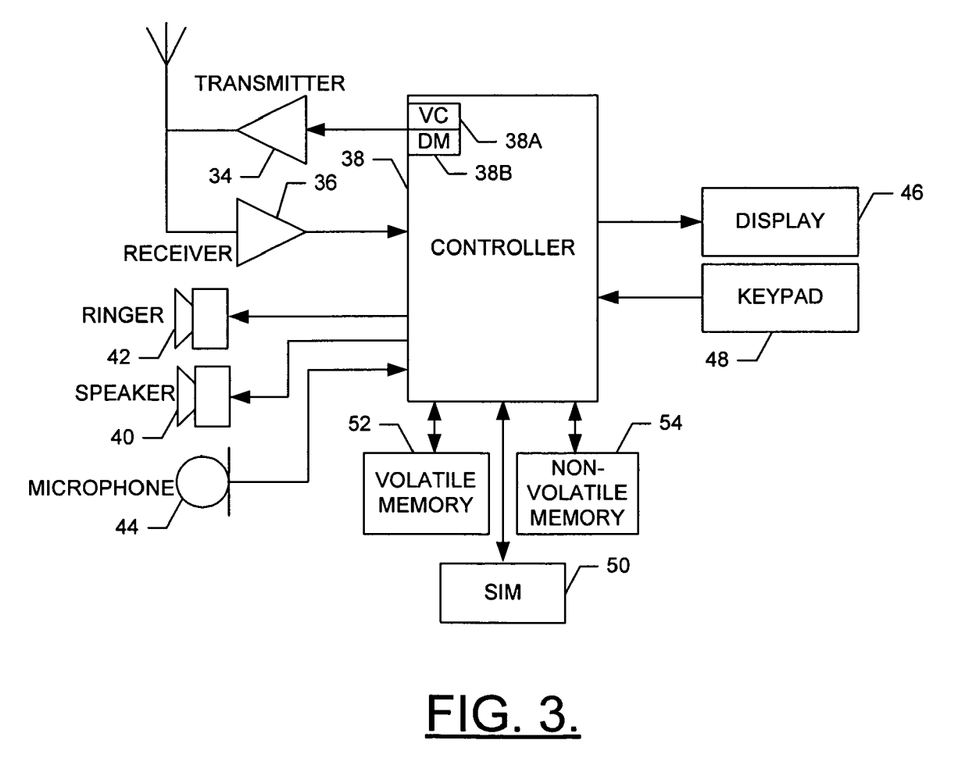
FIG. 3 is a functional diagram of a mobile station that may operate as an event server and/or invoking entity according to embodiments of the invention.

Reference is now made to FIG. 3, which more particularly illustrates a functional diagram of a mobile station that may operate as a SIP event server 12 (service provider) and/or invoking entity 14 according to embodiments of the invention. It should be understood, that the mobile station illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers and other types of voice and text communications systems, can readily employ the present invention.

The mobile station includes a transmitter 34, a receiver 36, and a controller 38 or other processor that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

It is understood that the controller 38 includes the circuitry required for implementing the audio and logic functions of the mobile station. For example, the controller may be comprised of a digital signal processor device, a microprocessor device, and various analog to digital converters, digital to analog converters, and/or other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 38A, and may include an internal data modem (DM) 38B. Further, the controller may include the functionally to operate one or more software programs, which may be stored in memory. For example, the controller may be capable of operating a connectivity program, such as a conventional Web browser. The connectivity program may then allow the mobile station to transmit and receive Web content, such as according to the Wireless Application Protocol (WAP), for example.

The mobile station also comprises a user interface including a conventional earphone or speaker 40, a ringer 42, a microphone 44, a display 46, and a user input interface, all of which are coupled to the controller 38. The user input interface, which allows the mobile station to receive data, can comprise any of a number of devices allowing the mobile station to receive data, such as a keypad 48, a touch display (not shown) or other input device. In embodiments including a keypad, the keypad includes the conventional numeric (0-9) and related keys (#, *), and other keys used for operating the mobile station.

The mobile station can also include memory, such as a subscriber identity module (SIM) 50, a removable user identity module (R-UIM) or the like, which typically stores information elements related to a mobile subscriber. In addition to the SIM, the mobile station can include other memory. In this regard, the mobile station can include volatile memory 52, such as volatile Random Access Memory (RAM) including a cache area for the temporary storage of data. The mobile station can also include other non-volatile memory 54, which can be embedded and/or may be removable. The non-volatile memory can additionally or alternatively comprise an EEPROM, flash memory or the like. The memories can store any of a number of pieces of information, and data, used by the mobile station to implement the functions of the mobile station. For example, the memories can store an identifier, such as an international mobile equipment identification (IMEI) code, international mobile subscriber identification (IMSI) code, mobile station integrated services digital network (MSISDN) code (mobile telephone number), Internet Protocol (IP) address or the like, capable of uniquely identifying the mobile station, such as to a mobile switching center (MSC). Also, for example, the memories can store instructions for creating messages related to embodiments of the present invention, as explained below.

As explained in the background section, devices such as mobile terminals require an asynchronous service invocation model whereby responses to a service invocation are passed back to the invoking devices using an alternative protocol mechanism to allow the responses to be delivered. Embodiments of the present invention therefore provide a system and method for invoking a service, such as a Web service, in an asynchronous manner. In accordance with embodiments of the present invention, service invocation is effectuated by an envoking entity 14 formatting and sending a service invocation request to an SIP event server 12 (service provider) in accordance with a given messaging architecture, such as by sending a service invocation request in accordance with SOAP. Then, in response to the service invocation request, the service provider can send, back to the invoking entity, a response formatted in accordance with the same messaging architecture (e.g., SOAP). To permit the SIP event server to more readily address the invoking entity, however, the response is transported to the invoking entity over the SIP event framework.

Figure 4:
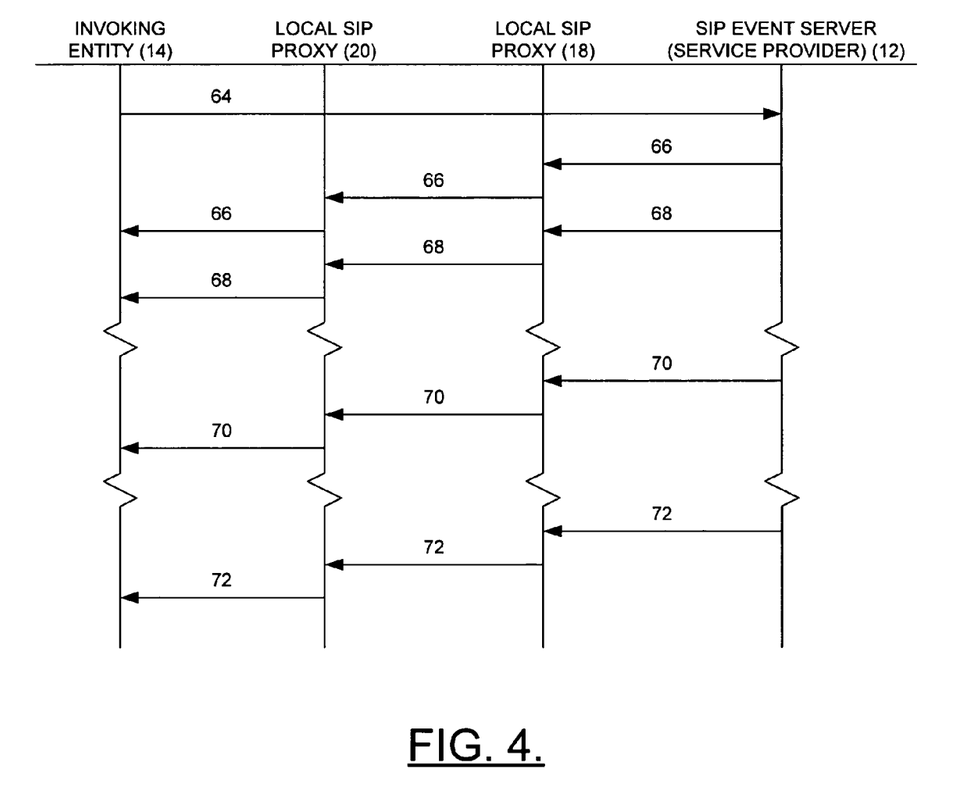
FIG. 4 shows message flows between entities in a method of service invocation according to one embodiment of the present invention.

Referring now to FIG. 4 in particular, as well as FIGS. 1-4 in general, message flows for a method of service invocation, according to one embodiment of the present invention, are shown. According to the method, the invoking entity 14 may invoke a desired service at an SIP event server 12 (service provider) by sending a request message 64 to the SIP event server, where the message requests a service invocation. In accordance with the service invocation method of embodiments of the present invention, the request message typically contains, in header information, a payload or the like, a contact address or URI of the invoking entity for notifications, as well as the identity or description of the service (e.g., service name) the invoking entity desires to invoke. In addition, the request message may include one or more parameters required to properly invoke the desired service. For example, the request message may include a parameter indicating a desire to receive or to not receive invocation status information as a callback to the service invocation duration of the subscription.

The request message 64 can be sent to the SIP event server 12 (service provider) in any of a number of different manners. For example, the request message can be sent in accordance with a messaging architecture framework such as that provided by SOAP (Simple Object Access Protocol). In accordance with SOAP, then, the invoking entity 14 can format the request message in accordance with a protocol such as XML (Extensible Markup Language) or RDF (Resource Description Framework), and thereafter encapsulate the formatted request message in a SOAP envelope. Further, if so desired, the SOAP envelope can be encoded in an appropriate format such as, for example, as a UTF-8 (Unicode Transformation Format-8) media type "application/soap+xml."

The invoking entity 14 can send the request message 64 to the SIP event server 12 (service provider) in a number of different manners. In accordance with SOAP, for example, the invoking entity can send the request message over a bearer protocol such as HTTP, BEEP (Blocks Extensible Exchange Protocol), or the like. Irrespective of how the invoking entity sends the request message, however, the SIP event server 12 can receive the request message, and extract the service invocation information (e.g., service description, parameter(s), other information, etc.) from the SOAP envelope. The SIP event server can then generate an implicit SIP event subscription based upon the service invocation information. The SIP event server can generate the implicit subscription in any of a number of different manners. For example, the SIP event server can generate an implicit subscription for an event such as "progress" in an event package such as "service invocation," where the URI of the invoking entity is included as the request URI of the subscription. In this regard, the event and event package can be configured in a manner similar to those conventionally configured in response to a SIP SUBSCRIBE message. For more information on such events and event packages, see IETF request for comment document IETF RFC 3265, entitled: *SIP-Specific Event Notification,* July 2002, the contents of which are hereby incorporated by reference in its entirety.

Also after extracting the service invocation information from the request message 64 (e.g., SOAP envelope), the SIP event server 12 (service provider) can invoke the desired service (identified in the request message) based upon the service invocation information. In addition, the SIP event server can appropriately confirm receipt of the request message, such as by sending message 66 (e.g., '200 OK' message) to the invoking entity 14 via proxies 18 and 20. In accordance with the same delivery framework (e.g., SOAP) with which the invoking entity sent the request message 64, the payload of message 66 can be encapsulated in a SOAP envelope. And again, if so desired, the SOAP envelope can be encoded in an appropriate format (e.g., UTF-8). In this manner, a delivery framework such as SOAP can be mapped on a service invocation event-based mechanism such as SIP.

Also after invoking the desired service, the SIP event server 12 (service provider) can, if so desired, send a NOTIFY message 68 back to the invoking entity 14 via proxies 18 and 20, in accordance with the implicit subscription. This message includes the current progress of the invoked service which, just upon invoking the service, may indicate that the service has "started." Alternatively, if the SIP event server fails to invoke the desired service, such as due to one or more incorrect parameters, lack of permission to invoke the service, or the like, the NOTIFY message may indicate such a failure to invoke the desired service. Irrespective of the contents of the NOTIFY message, like message 68, the NOTIFY message can be encapsulated in a SOAP envelope which, if so desired, can be encoded in an appropriate format (e.g., UTF-8).

Depending on the length of the subscription and/or the nature of the invoked service, the invoking entity 14 may receive one or more notifications at one or more regular or irregular intervals from the SIP event server 12 (service provider), the payload of each of which can be encapsulated in a SOAP envelope. More particularly, at one or more instances after generating the SIP event subscription, the SIP event server may generate a NOTIFY message 70 with a payload including information related to the current progress of the invoked service. Additionally or alternatively, the SIP event server may notify the invoking entity of a graceful termination or failure of the invoked service with a NOTIFY message 72, at which time the SIP event server can also terminate the implicit subscription. As with the initial NOTIFY message 68, the payloads of the subsequent NOTIFY messages 70, 72 can be encapsulated in a SOAP envelope, with the subsequent NOTIFY messages being sent to the invoking entity via SIP proxies 18 and 20 in accordance with the SIP framework.

Although not shown, at any given instance before expiration of the subscribed service invocation, the invoking entity 14 may desire to terminate the service invocation at the SIP event server 12 (service provider). In such instances, the invoking entity may terminate the service invocation, and thus the implicit subscription, in a manner similar to that in which the invoking entity effected the service invocation, and thus the implicit subscription. That is, the invoking entity can send a request message (see request message 64) to the SIP event server. In contrast to the request message sent by the invoking entity to invoke the service, however, the request message to terminate the invoked service requests termination of an invoked service.

As explained above, the service invocation request is sent in accordance with a messaging architecture framework such as that provided by SOAP (Simple Object Access Protocol), where the responses from the SIP event server 12 include a payload formatted in accordance with the same messaging framework architecture. It should be understood, however, that the system and method of embodiments of the present invention can equally operate in accordance with any of a number of messaging architectures other than SOAP. For example, the service invocation request can alternatively be sent in accordance with SMS (Short Messaging Service), MMS (Multimedia Messaging Service), E-Mail (e.g., SMTP—Simple Mail Transfer Protocol), DCOM (Distributed Component Object Model), CORBA (Common Object Request Broker Architecture), JAVA or the like. In such instances, the request message 64 and payload of the response messages (e.g., message 68, NOTIFY messages 70, 72, etc.) can be formatted in accordance with a number of messaging protocols other than SOAP. For example, the messages can be formatted in accordance with messaging protocols such as RPC (Remote Procedure Call) for the DCOM architecture, IIOP (Internet Inter-Object Request Broker Protocol) for the CORBA architecture, RMI (Remote Method Invocation) for the JAVA architecture.

According to one aspect of the present invention, all or a portion of the system of the present invention, such all or portions of the SIP event server 12 (service provider), invoking entity 14 and/or SIP proxy 18, 20, generally operate under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 4 is a control flow diagram of methods, systems and program products according to the invention. It will be understood that each block or step of the control flow diagram, and combinations of blocks in the control flow diagram, can be implemented by computer program instructions. These computer program instructions may be loaded onto a computer or other programmable apparatus to produce a machine, such that the instructions which execute on the computer or other programmable apparatus create means for implementing the functions specified in the control flow diagram block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the control flow diagram block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the control flow diagram block(s) or step(s).

Accordingly, blocks or steps of the control flow diagram support combinations of means for performing the specified functions, combinations of steps for performing the specified functions and program instruction means for performing the specified functions. It will also be understood that each block or step of the control flow diagram, and combinations of blocks or steps in the control flow diagram, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for invoking a service, the system comprising:
an invoking entity configured to send a service invocation request to effectuate invocation of a service, the service invocation request being formatted and sent in accordance with a given messaging architecture; and
a network entity configured to receive the service invocation request, and send a response to the service invocation request across a SIP (Session Initiation Protocol) architecture, the response including a payload formatted in accordance with the given messaging architecture,
wherein the invoking entity is configured to send, and the network entity is configured to receive, the service invocation request independent of the SIP architecture.

2. A system according to claim 1, wherein the network entity is further configured to generate an implicit SIP event subscription for the service invocation in response to receiving the service invocation request, and
wherein the network entity is configured to send a response in accordance with the implicit SIP event subscription.

3. A system according to claim 1, wherein the invoking entity is configured to send the service invocation request encapsulated in accordance with a protocol of the given messaging architecture, the request being sent over a bearer protocol.

4. A system according to claim 3, wherein the network entity is configured to receive the service invocation request in accordance with the SOAP (Simple Object Access Protocol) architecture, the service invocation request being encapsulated in a SOAP envelope.

5. A system of invoking a service, the system comprising:
a network entity configured to receive a service invocation request to effectuate invocation of a service, the service invocation request being formatted and received in accordance with a given messaging architecture; and
an invoking entity configured to receive, from the network entity, a response to the service invocation request across a SIP (Session Initiation Protocol) architecture, the response including a payload formatted in accordance with the given messaging architecture,
wherein the network entity is configured to receive the service invocation request independent of the SIP architecture.

6. A system according to claim 5, wherein the network entity is configured to generate an implicit SIP event subscription for the service invocation in response to receiving the service invocation request, and
wherein the invoking entity is configured to receive a response in accordance with the implicit SIP event subscription.

7. A system according to claim 5, wherein the network entity is configured to receive the service invocation request encapsulated in accordance with a protocol of the given messaging architecture, the request being received over a bearer protocol.

8. A system according to claim 7, wherein the invoking entity is configured to send the service invocation request in accordance with the SOAP (Simple Object Access Protocol) architecture, the service invocation request being encapsulated in a SOAP envelope.

9. An apparatus comprising:
a processor configured to receive a service invocation request to effectuate invocation of a service, the service invocation request being formatted and received in accordance with a given messaging architecture, wherein the processor is also configured to send a response to the service invocation request across a SIP (Session Initiation Protocol) architecture, the response including a payload formatted in accordance with the given messaging architecture, and wherein the processor is configured to receive the service invocation request independent of the SIP architecture.

10. An apparatus according to claim 9, wherein the processor is further configured to generate an implicit SIP event subscription for the service invocation in response to receiving the service invocation request, and wherein the processor is configured to send the response in accordance with the implicit SIP event subscription.

11. An apparatus according to claim 9, wherein the processor is configured to receive the service invocation request encapsulated in accordance with a protocol of the given messaging architecture, the request being received over a bearer protocol.

12. An apparatus according to claim 11, wherein the processor is configured to receive the service invocation request in accordance with the SOAP (Simple Object Access Protocol) architecture, the service invocation request being encapsulated in a SOAP envelope.

13. An apparatus comprising:

a processor configured to send a service invocation request to effectuate invocation of a service, the service invocation request being formatted and sent in accordance with a given messaging architecture, wherein the processor is configured to receive a response to the service invocation request across a SIP (Session Initiation Protocol) architecture, the response including a payload formatted in accordance with the given messaging architecture, and wherein the processor is configured to send a service invocation request independent of the SIP architecture.

14. An apparatus according to claim 13, wherein the processor is configured to send, to a network entity, a service invocation request such that the network entity generates an implicit SIP event subscription for the service invocation in response to receiving the service invocation request, and wherein the processor is configured to receive, from the network entity, a response in accordance with the implicit SIP event subscription.

15. An apparatus according to claim 13, wherein the processor is configured to send the service invocation request encapsulated in accordance with a protocol of the given messaging architecture, the request being sent over a bearer protocol.

16. An apparatus according to claim 15, wherein the processor is configured to send the service invocation request in accordance with the SOAP (Simple Object Access Protocol) architecture, the service invocation request being encapsulated in a SOAP envelope.

17. A method of invoking a service, the method comprising:

receiving a service invocation request to effectuate invocation of a service, the service invocation request being formatted and received in accordance with a given messaging architecture; and sending a response to the service invocation request across a SIP (Session Initiation Protocol) architecture, the response including a payload formatted in accordance with the given messaging architecture, wherein receiving a service invocation request comprises receiving a service invocation request independent of the SIP architecture.

18. A method according to claim 17 further comprising:

generating an implicit SIP event subscription for the service invocation in response to receiving the service invocation request, wherein sending a response comprises sending a response in accordance with the implicit SIP event subscription.

19. A method according to claim 17, wherein receiving a service invocation request comprises receiving a service invocation request encapsulated in accordance with a protocol of the given messaging architecture, the request being received over a bearer protocol.

20. A method according to claim 19, wherein receiving a service invocation request comprises receiving a service invocation request in accordance with the SOAP (Simple Object Access Protocol) architecture, the service invocation request being encapsulated in a SOAP envelope.

21. A method of invoking a service, the method comprising:

sending a service invocation request to effectuate invocation of a service, the service invocation request being formatted and sent in accordance with a given messaging architecture; and receiving a response to the service invocation request across a SIP (Session Initiation Protocol) architecture, the response including a payload formatted in accordance with the given messaging architecture, wherein sending a service invocation request comprises sending a service invocation request independent of the SIP architecture.

22. A method according to claim 21, wherein sending a service invocation request comprises sending, to a network entity, a service invocation request such that the network entity generates an implicit SIP event subscription for the service invocation in response to receiving the service invocation request, and wherein receiving a response comprises receiving, from the network entity, a response in accordance with the implicit SIP event subscription.

23. A method according to claim 21, wherein sending a service invocation request comprises sending a service invocation request encapsulated in accordance with a protocol of the given messaging architecture, the request being sent over a bearer protocol.

24. A method according to claim 23, wherein sending a service invocation request comprises sending a service invocation request in accordance with the SOAP (Simple Object Access Protocol) architecture, the service invocation request being encapsulated in a SOAP envelope.

* * * * *